US012253740B2

(12) United States Patent
Sharma et al.

(10) Patent No.: US 12,253,740 B2
(45) Date of Patent: Mar. 18, 2025

(54) IMPACT RESISTANT HEATED WINDOW MOUNT FOR THERMAL CAMERA

(71) Applicant: Waymo LLC, Mountain View, CA (US)

(72) Inventors: Shashank Sharma, Mountain View, CA (US); Matthew Last, San Jose, CA (US)

(73) Assignee: Waymo LLC, Mountain View (CA)

( * ) Notice: Subject to any disclaimer, the term of this patent is extended or adjusted under 35 U.S.C. 154(b) by 796 days.

(21) Appl. No.: 17/114,808

(22) Filed: Dec. 8, 2020

(65) Prior Publication Data

US 2022/0176892 A1   Jun. 9, 2022

(51) Int. Cl.
| | |
|---|---|
| *B60R 11/04* | (2006.01) |
| *B60S 1/02* | (2006.01) |
| *G01J 5/02* | (2022.01) |
| *G01J 5/061* | (2022.01) |
| *G01J 5/08* | (2022.01) |
| *G01J 5/0806* | (2022.01) |

(Continued)

(52) U.S. Cl.
CPC .............. *G02B 7/181* (2013.01); *B60S 1/026* (2013.01); *G01J 5/0205* (2013.01); *G01J 5/061* (2013.01); *G01J 5/08* (2013.01); *G01J 5/0806* (2013.01); *G01J 5/0875* (2013.01); *G01J 2005/063* (2013.01)

(58) Field of Classification Search
None
See application file for complete search history.

(56) References Cited

U.S. PATENT DOCUMENTS

| | | |
|---|---|---|
| 6,649,912 B2 | 11/2003 | Salapow et al. |
| 7,627,235 B2 | 12/2009 | McCutchen et al. |
| 7,742,076 B2 | 6/2010 | Seo et al. |

(Continued)

FOREIGN PATENT DOCUMENTS

| | | |
|---|---|---|
| CN | 108540702 A | 9/2018 |
| EP | 2663907 B1 | 8/2018 |

(Continued)

OTHER PUBLICATIONS

Chen et al., "Pedestrian Detection for Autonomous Vehicle Using Multi-Spectral Cameras," IEEE Transactions on Intelligent Vehicles, Jun. 2, 2019, vol. 4, No. 2 (Need Page Numbers and Reference).

(Continued)

*Primary Examiner* — Marcus H Taningco
(74) *Attorney, Agent, or Firm* — McDonnell Boehnen Hulbert & Berghoff LLP

(57) ABSTRACT

The present disclosure relates to optical systems, vehicles, and methods for providing improved mechanical performance of a camera and corresponding optical elements. An example optical system includes an outer housing and an inner support member. The optical system also includes an optical window coupled to the outer housing and the inner support member. The optical window is configured to be temperature-controllable. The optical system also includes a camera coupled to the inner support member. The camera is optically coupled to the optical window. Additionally, the outer housing, the optical window, and the camera are configured to be impact resistant.

18 Claims, 8 Drawing Sheets

(51) Int. Cl.
*G01J 5/0875* (2022.01)
*G02B 7/18* (2021.01)

(56) References Cited

U.S. PATENT DOCUMENTS

| | | | |
|---|---|---|---|
| 8,497,907 | B2 | 7/2013 | Barefoot et al. |
| 8,542,451 | B2 | 9/2013 | Lu et al. |
| 8,570,374 | B2 | 10/2013 | Betham et al. |
| 9,618,828 | B2 | 4/2017 | Lang et al. |
| 9,623,799 | B2 | 4/2017 | Bingle et al. |
| 9,762,779 | B2 | 9/2017 | Dispenza et al. |
| 10,214,157 | B2 | 2/2019 | Achenbach et al. |
| 10,306,113 | B2 | 5/2019 | Lee et al. |
| 10,440,247 | B2 | 10/2019 | Wang et al. |
| 10,549,690 | B1 | 2/2020 | Englander et al. |
| 2013/0129338 | A1 | 5/2013 | Dowell |
| 2015/0073584 | A1 | 3/2015 | Goodale et al. |
| 2015/0160536 | A1 | 6/2015 | Lang et al. |
| 2015/0212336 | A1 | 7/2015 | Hubert et al. |
| 2016/0368587 | A1* | 12/2016 | Apdalhaliem ........ B64C 1/1484 |
| 2017/0297504 | A1 | 10/2017 | Leonelli |
| 2018/0017785 | A1 | 1/2018 | Bulgajewski et al. |
| 2019/0227304 | A1 | 7/2019 | Eftekhari et al. |
| 2019/0302576 | A1 | 10/2019 | Rafalowski et al. |
| 2020/0215994 | A1 | 7/2020 | Bingle et al. |
| 2021/0199953 | A1* | 7/2021 | Hong ................... G02B 7/026 |
| 2021/0255457 | A1* | 8/2021 | Ide ................... G02B 27/0006 |

FOREIGN PATENT DOCUMENTS

| | | |
|---|---|---|
| JP | 6593360 | 10/2019 |
| KR | 200377583 Y1 | 3/2005 |

OTHER PUBLICATIONS

May, Clyde J., "Controlled Impact Demonstration On-Board (Interior) Photographic System," NASA/FAA Government/Industry CID Workshop, NASA Langley Research Center, Apr. 10, 1985, pp. 209-239.

International Searching Authority, International Search Report and Written Opinion mailed on Apr. 12, 2022, issued in connection with International Patent Application No. PCT/US2021/072768 filed on Dec. 6, 2021, 9 pages.

\* cited by examiner

IMPACT RESISTANT HEATED WINDOW MOUNT FOR THERMAL CAMERA

BACKGROUND

Optical systems (e.g., cameras) include outer windows that can be subject to impacts from various objects (e.g., rocks, precipitation, etc.). Conventional solutions include using thicker and/or stronger materials for the optical windows. However, such materials may reduce the image quality of the optical system (e.g., increased optical defects) and/or reduce the optical transmittance of the optical window itself. Accordingly, a need exists to improve impact resistance of optical windows while providing high quality images from the optical system.

SUMMARY

The present disclosure relates to camera systems that may provide improved structural properties (e.g., impact resistance) compared to conventional solutions. In some examples, such camera systems could include optical systems configured to be utilized with self-driving vehicles.

In a first aspect, an optical system is provided. The optical system includes an outer housing and an inner support member. The optical system also includes an optical window coupled to the outer housing and the inner support member. The optical window is configured to be temperature-controllable. The optical system also comprises a camera coupled to the inner support member. The camera is optically coupled to the optical window. The outer housing, the optical window, and the camera are configured to be impact resistant.

In a second aspect, a vehicle is provided. The vehicle comprises an optical system comprising an outer housing and an optical window coupled to the outer housing. The optical window is configured to be temperature-controllable. The optical system also includes a camera coupled to an inner support member and optically coupled to the temperature-controllable window. The outer housing, the optical window, and the camera are configured to be impact resistant.

Other aspects, embodiments, and implementations will become apparent to those of ordinary skill in the art by reading the following detailed description, with reference where appropriate to the accompanying drawings.

DETAILED DESCRIPTION

Figure 1:
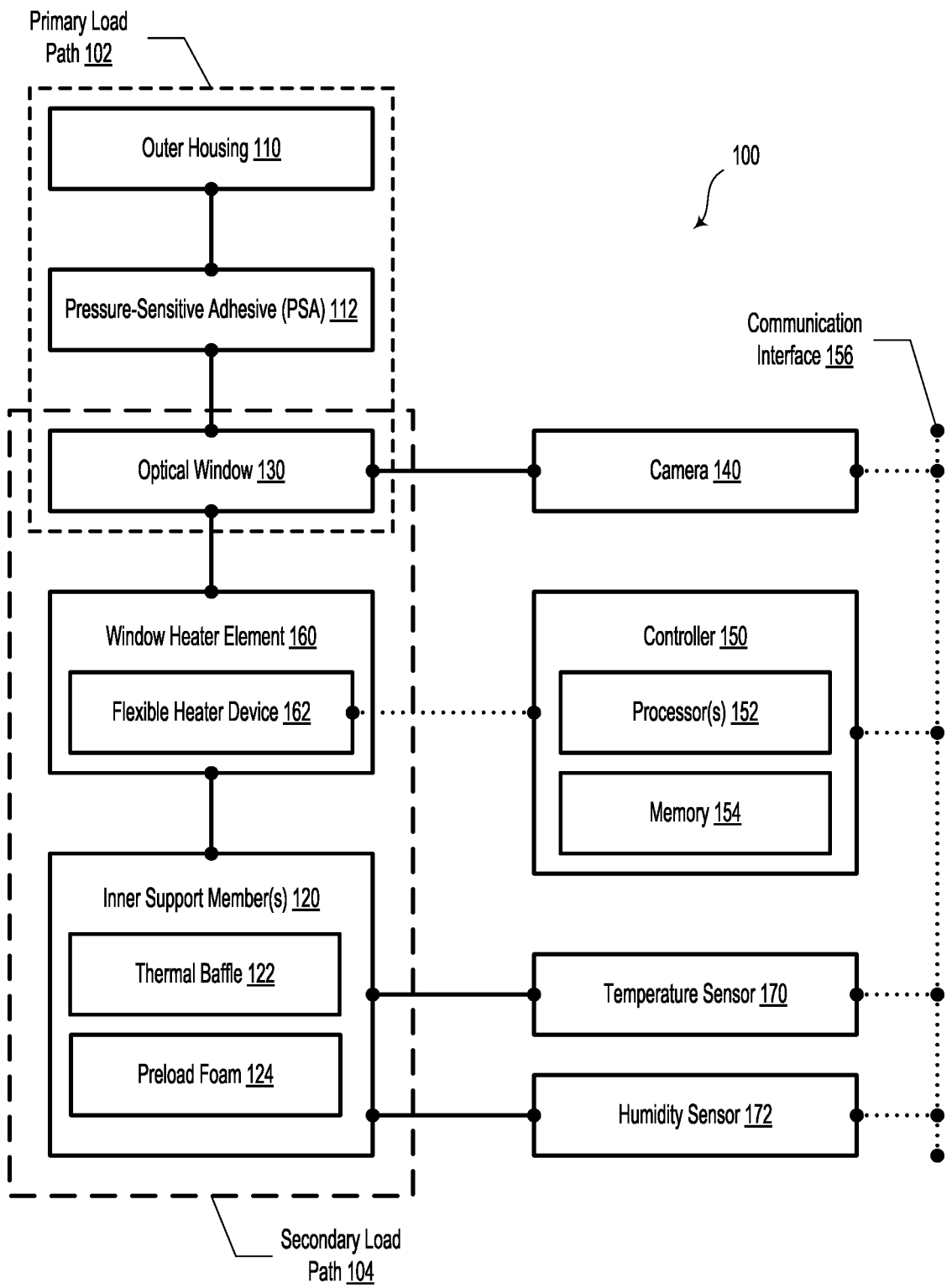
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Self-driving vehicles can utilize multiple sensors to obtain information about the external environment for route planning, perception, and navigation. In some scenarios, such sensors can include visible cameras, infrared cameras, and lidar sensors.

In driving scenarios, vehicle-mounted sensors can be subject to rock and debris strikes and other types of impacts. Accordingly, it may be desirable to protect the vehicle-mounted sensors by way of an impact-resistant housing and/or optical window. Such an optical window and housing could protect the sensors from dirt, dust, rain, snow, rocks, etc. In some embodiments, the optical window and/or at least a portion of the impact-resistant housing could be replaceable in case of impact damage.

In various examples, the impact-resistant housing could provide a plurality of impact-resistant features, such as shock-absorbing materials and/or multiple load paths.

In some examples, the optical windows could be formed from silicon and/or germanium. Other materials transmissive to infrared light (e.g., long-wavelength infrared LWIR light) are possible and contemplated. The ability to sense wavelengths around 10 μm (e.g., LWIR light) can be used by self-driving vehicles to detect important objects near the vehicle (e.g., pedestrians or wild animals) during night time and bad weather. The optical window should also be able to survive rock strikes (e.g., to an impact protection rating of IK07). In various embodiments, IK07 could include protection against 2 joules of impact (the equivalent to the impact of a 0.5 kg mass dropped from 400 mm above the impacted surface). However, silicon and germanium are fracture sensitive materials and increasing thickness leads to significant loss in transmission and an increase in sensor module cost.

In various embodiments, vehicle-mounted sensors could provide information about the environment via an optical window that could be configured to be temperature controllable. As an example, a temperature of the window could be controlled based on a dew point of the external environment. Additionally or alternatively, the temperature of the window could be controlled based on a temperature sensor and/or humidity sensor. The optical window may also be heated to be able to de-ice and clear condensation given the high safety and reliability needs for sensing in autonomous vehicles.

In some examples, the mounting structure helps optical windows absorb more impact energy for a given thickness. In example embodiments, the window could be attached to a front housing (plastic) using a pressure-sensitive adhesive (PSA), which may provide a soft edge mount. Such a physical mount could provide for the window to move and absorb energy especially for rock strikes close to the edge of the window. Ceramics can be weaker near edges due to cracks and other imperfections that could be created during shaping operations. The PSA also provides an IP69K seal that protects the inner parts of the sensor module.

The Ingress Protection (IP) rating system is an internationally-recognized scale that quantifies a system's or component's level of protection against environmental factors such as liquids and solids. The IP69K rating provides protection against ingress of dust and high temperature, high pressure water—making products with this certification ideal for use in conditions where equipment must be carefully sanitized.

The window is heated using a flex type heater that is preloaded into the window using a plastic piece with a foam backing. During a rock strike near the window center, the energy is mostly stored in the window flexing which is allowed by the foam deflection.

In either case, the load path allows most of the force to be transmitted from window to PSA and to the outer housing preventing the inner parts (fragile electronics, lens and camera core sensor, shutter mechanism) from seeing much of an impact load. In other words, the primary load path could include load transferred from the optical window through the outer housing of the module. In such a scenario, the secondary load path could be provided by way of an inner support member and heater. The secondary load path typically carries little load, but may allow for a contact heater connection to the window. In some embodiments, the optical window is flush to an outside bezel to make cleaning easier.

The present disclosure may provide a much higher impact resistance (and thus higher impact rating) for a given thickness of window (minimizing cost and transmission loss). Examples also reduce impact load felt by inner fragile electronics. Furthermore, another benefit of the present disclosure is the ability to replace the window and the front housing with inexpensive polycarbonate and in case of window damage, the inner components may stay intact.

II. Example Optical Systems

FIG. 1 illustrates an optical system 100, according to an example embodiment. In some examples, the optical system 100 could include a camera system for capturing images of a scene. In specific embodiments, the optical system 100 could provide imaging functionality for a self-driving vehicle, a robot, or another type of vehicle configured to navigate its environment. The optical system 100 described herein could provide improved resistance to physical impacts, such as strikes due to rocks, dust, precipitation, etc. In an example embodiment, the optical system 100 could be configured to provide external impact protection up to IK07, which may correspond to 2 joules of impact (the equivalent of a 0.5 kg mass dropped from 400 mm above impacted surface). Higher impact protection factors (e.g., IK08, IK09, etc.) are possible and contemplated.

The optical system 100 includes an outer housing 110 and an inner support member 120. In some embodiments, the outer housing 110 could be formed from a metal such as aluminum or titanium and/or a plastic, such as polyethylene or polycarbonate. Furthermore, in some examples, the inner support member 120 could be formed from a metal (e.g., aluminum), a composite (e.g., ceramic), or plastic (e.g., polycarbonate). It will be understood that other materials are possible and contemplated for the outer housing 110 and the inner support member 120.

The optical system 100 includes an optical window 130 coupled to the outer housing 110 and the inner support member 120. In an example embodiment, the optical window 130 could be formed from various infrared-transmissive materials, such as silicon, germanium, etc. In some embodiments, the optical window 130 is configured to be temperature-controllable (e.g., by way of a controllable heater element). In further examples, an outer surface of the optical window 130 could be disposed such that it is substantially flush with an outer surface of the outer housing 110. Such embodiments may provide improved ease of cleaning and/or maintenance.

The optical system 100 additionally includes a camera 140 coupled to the inner support member 120. The camera 140 is optically coupled to the optical window 130. In such scenarios, the outer housing 110, the optical window 130, and the camera 140 are configured to be impact resistant. The camera 140 could be configured to capture images of a field of view of an environment inside or outside a vehicle.

In some embodiments, the optical system 100 also includes a pressure-sensitive adhesive (PSA) 112. In such scenarios, the outer housing 110 is coupled to the optical window 130 by way of the pressure-sensitive adhesive 112. In some embodiments, the PSA 112 could provide substantial ingress protection to reduce or eliminate dust and/or water, etc. from entering the outer housing 110. As an example, the PSA 112 and other elements (e.g., gasket 210) could be configured to provide ingress protection up to at least IP69K, which could correspond to "dust tightness" and/or protection against close-range high pressure and/or high temperature water spray.

In various examples, the optical system 100 may provide that when an impact force is applied to the optical window 130, the force is distributed via a primary load path 102 and a secondary load path 104. In such scenarios, the primary load path 102 includes the optical window 130 and the outer housing 110. Furthermore, the secondary load path 104 could include the optical window 130 and the inner support member 120. In such scenarios, the mounting structure may provide multiple load paths for a given impact. Furthermore, such examples could dissipate shock loads more evenly throughout the optical system 100 so as to avoid cracks and/or chips in the optical window 130 due to physical impacts.

In some embodiments, the camera 140 could be a thermal infrared camera (e.g., a thermographic imager). In such scenarios, the thermal infrared camera could form images of a field of view of an environment of the camera using infrared light. In some embodiments, the camera could be sensitive to wavelengths from approximately 1 micron to 14 microns. However, other wavelengths and wavelength ranges are possible and contemplated.

In some embodiments, the inner support member 120 could include a thermal baffle 122 and a preload foam 124. In some embodiments, the thermal baffle 122 could include one or more protrusions that could limit the field of view of the camera 140 and prevent light (infrared or otherwise) from impinging onto the camera 140. In some embodiments, the thermal baffle 122 could be maintained at a desired temperature so as to reduce or minimize stray thermal noise in the camera 140.

In example embodiments, the optical system 100 yet further includes a window heater element 160. In such scenarios, the window heater element 160 includes a flexible heater device 162. In various examples, the window heater element 160 is disposed between the optical window 130 and the inner support member 120. In cases where the camera 140 is a thermal infrared camera, maintaining the optical window 130 at a known and/or desired temperature may improve thermal imaging accuracy and/or improve disambiguation of objects in a given scene. In some embodiments, the flexible heater device 162 could include a heater element disposed on or in a flexible substrate material, such as silicone rubber or polyimide. Other materials are contemplated and possible for flexible heater device 162.

In various embodiments, the window heater element 160 could be coupled to the inner support member 120. For example, the window heater element 160 could be disposed between the inner support member 120 and an inner surface of the optical window 130. In one embodiments, the window heater element 160 could have a ring-like shape that could be disposed proximate to an outer edge the optical window 130.

In an example embodiment, the optical system 100 could additionally include at least one of a temperature sensor 170 or a humidity sensor 172. In such scenarios, the temperature sensor 170 and/or the humidity sensor 172 could be disposed proximate to the inner support member 120. In an example embodiment, the temperature sensor 170 could be configured to detect a temperature (e.g., between −20° C. and 60° C. with 0.1° C. resolution) of various components and/or spaces within the outer housing 110. For example, the temperature sensor 170 could be configured to provide information indicative of a current temperature of the camera 140, the inner support member 120, and/or the optical window 130. The humidity sensor 172 could be configured to provide information indicative of a humidity (e.g., between 5% and 95% humidity with 1% resolution) of various regions inside or outside the outer housing 110. For example, the humidity sensor 172 could be configured to determine a concentration of water vapor present inside the outer housing 110.

In some embodiments, the optical system 100 may additionally include a controller 150. In some embodiments, the controller 150 could be communicatively coupled (e.g., wirelessly or wired) to various elements of optical system 100 by way of communication interface 156. For example, the controller 150 could be communicatively coupled to the camera 140, the temperature sensor 170, and the humidity sensor 172 in a wired or wireless manner by way of the communication interface 156.

The controller 150 could include at least one processor 152 and a memory 154. In such scenarios, the at least one processor 152 is configured to execute instructions stored in the memory 154 so as to carry out operations. In various embodiments, the operations could include receiving information indicative of at least one of a temperature or a humidity (e.g., from temperature sensor 170 and humidity sensor 172, respectively).

The operations could additionally or alternatively include adjusting, based on the received information, a desired temperature of the flexible heater device 162. In some examples, the information provided by the temperature sensor 170 and/or the humidity sensor 172 could be utilized by controller 150 to control the flexible heater device 162 and/or other aspects of the optical system 100.

Figure 2A:
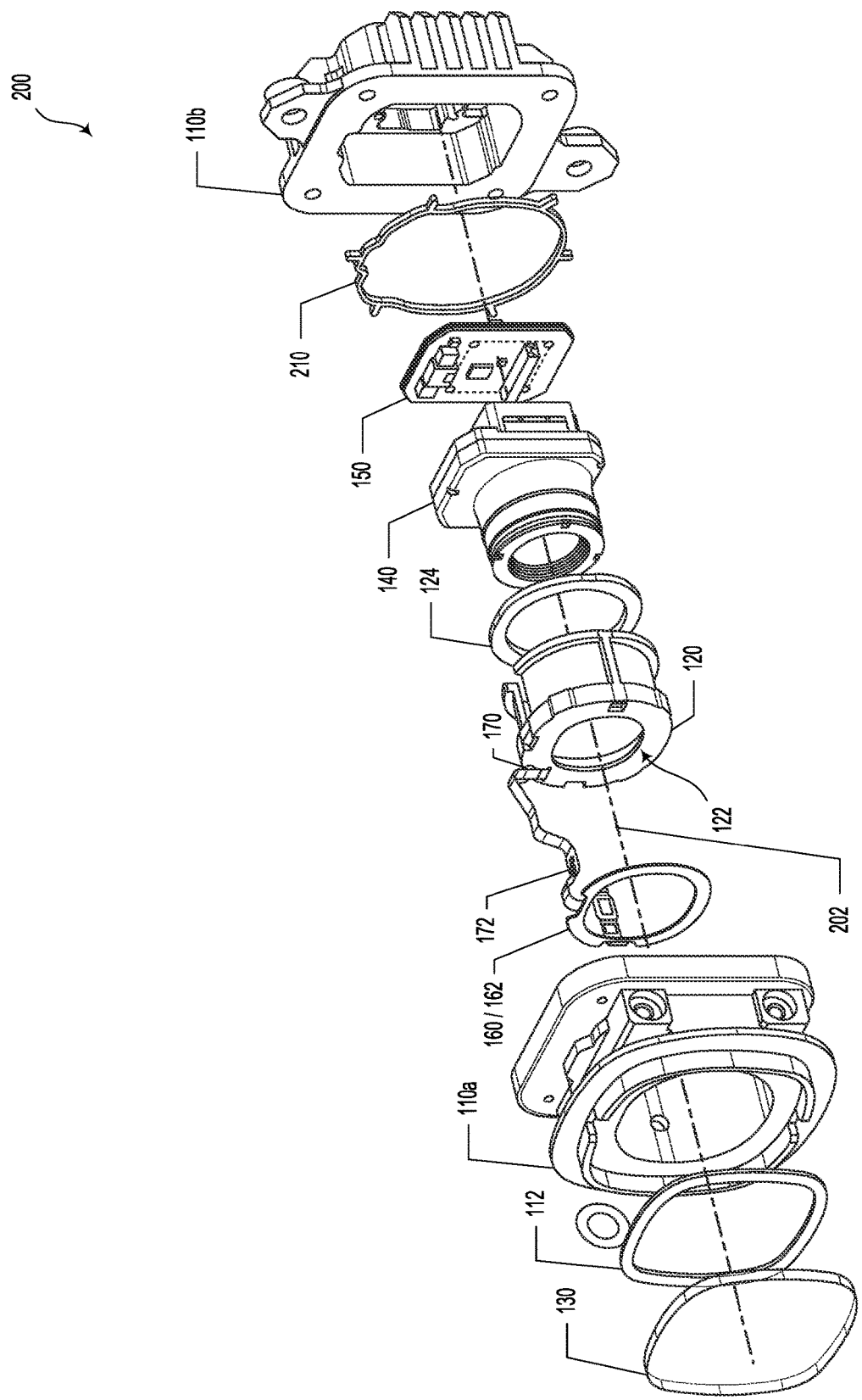
FIG. 2A illustrates the optical system of FIG. 1, according to an example embodiment.

FIG. 2A illustrates the optical system 100 of FIG. 1, according to an example embodiment. FIG. 2A provides an "exploded" view 200 of the optical system 100 where various components of optical system 100 have been exploded along an optical axis 202. As illustrated in FIG. 2A, optical system 100 could include a seal or gasket 210, which could provide ingress protection between outer housing portion 110a and outer housing portion 110b. While FIG. 2A provides an example illustration, it will be understood that other arrangements, stack-ups, and/or elements are possible and contemplated within the context of the present disclosure.

Figure 2B:
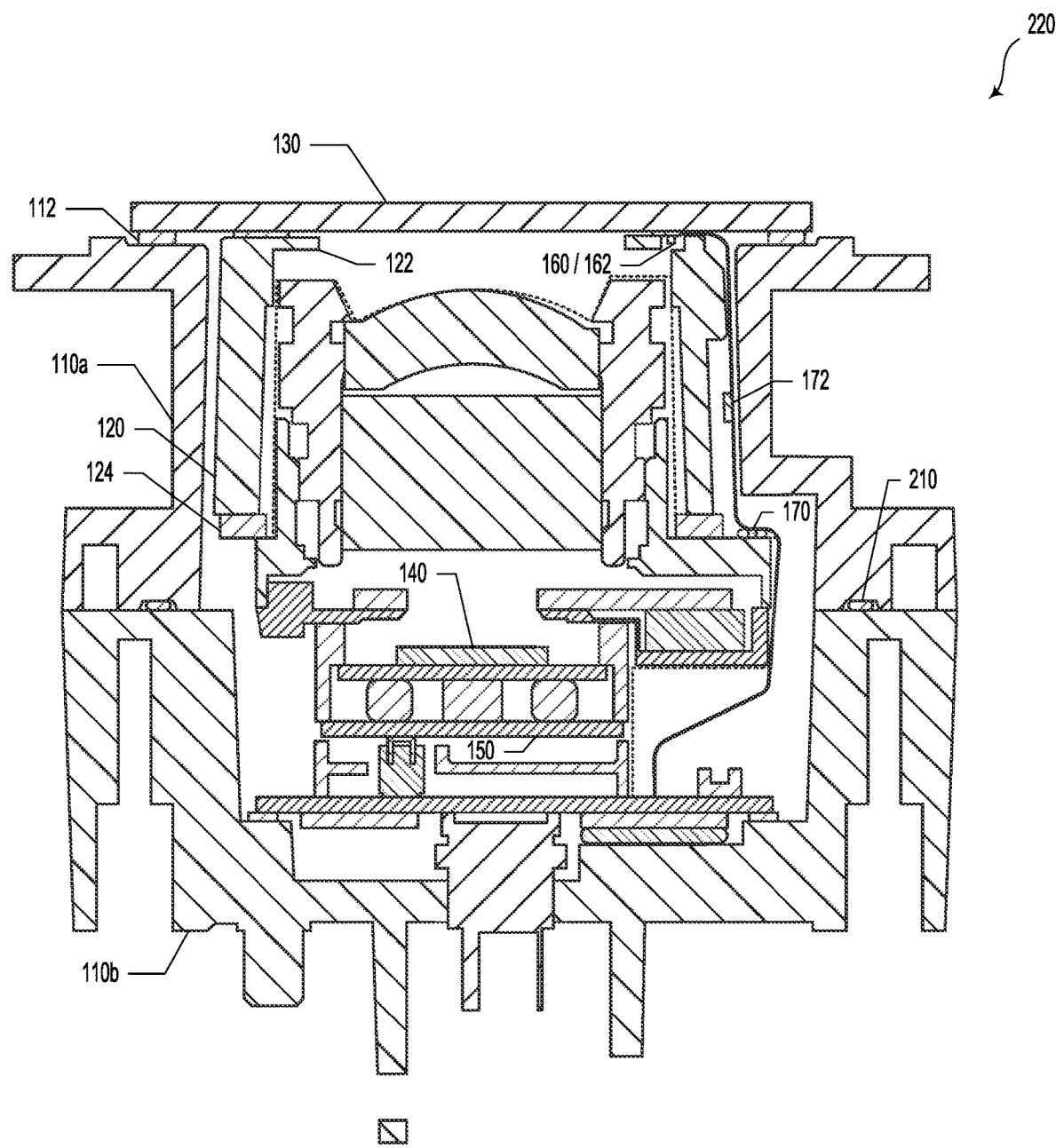
FIG. 2B illustrates the optical system of FIG. 1, according to an example embodiment.

FIG. 2B illustrates the optical system 100 of FIG. 1, according to an example embodiment. As illustrated, FIG. 2B shows a cross-sectional view 220 of the optical system 100. While FIG. 2B provides an example illustration of optical system 100, it will be understood that other arrangements, stack-ups, and/or elements are possible and contemplated within the context of the present disclosure.

Figure 3:
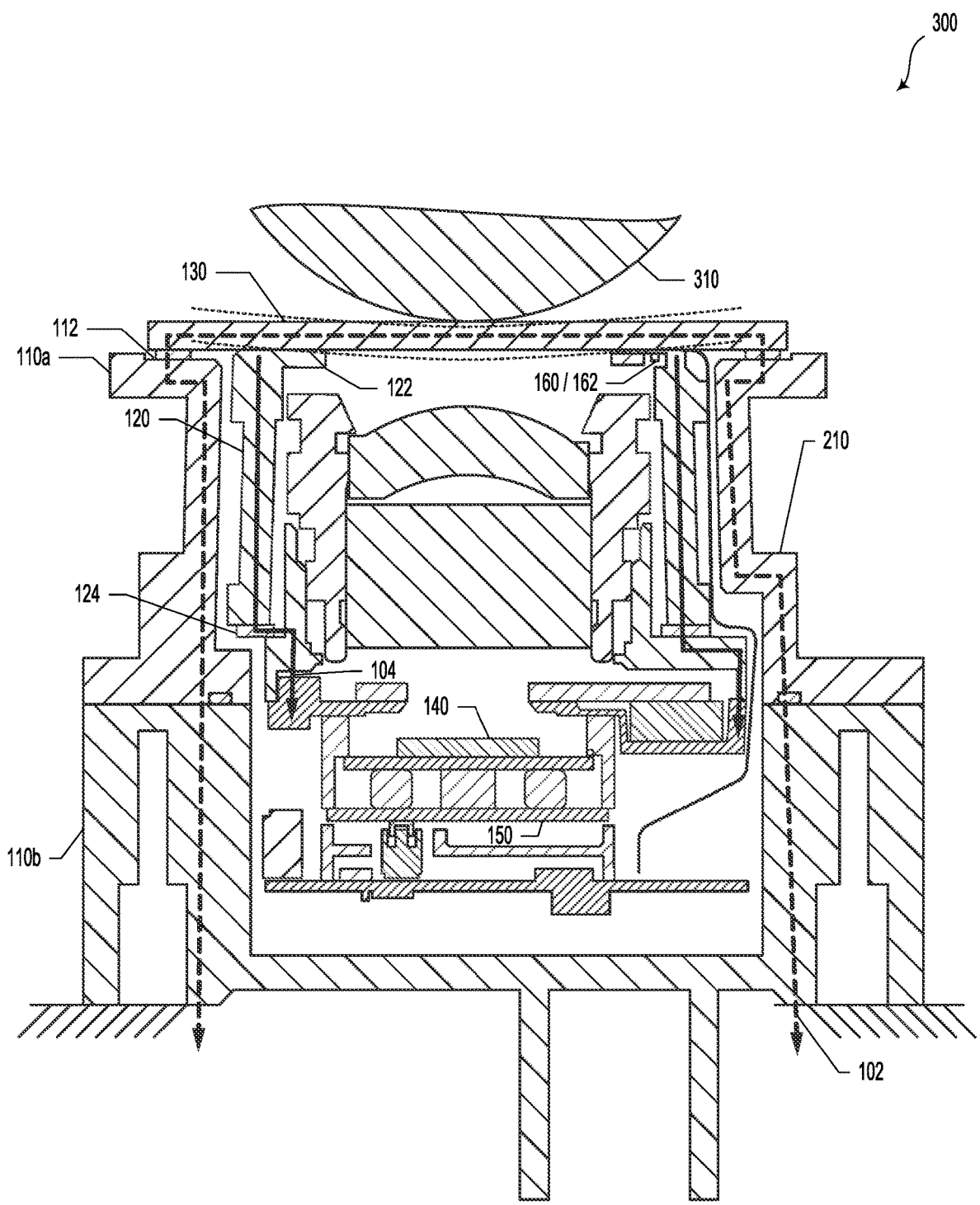
FIG. 3 illustrates a scenario involving the optical system of FIG. 1, according to an example embodiment.

FIG. 3 illustrates a scenario 300 involving the optical system 100 of FIG. 1, according to an example embodiment. As illustrated, an object 310 could impact the optical window 130. Upon such an impact, strike forces could be distributed along primary load path 102 and/or secondary load path 104. In some embodiments, the elements of optical system 100 could be configured and/or arranged so that approximately half of the load could be dissipated by way of the primary load path 102 and the other half of the load could be dissipated by way of the secondary load path 104. However, other configurations or arrangements are possible. For example, the primary load path 102 could be configured to solely dissipate loads up to a threshold energy value. In such a scenario, the secondary load path 104 could be configured to dissipate the excess load amounts above the threshold energy value. Other ways to dissipate strike forces in the optical system 100 are possible and contemplated.

Figure 4:
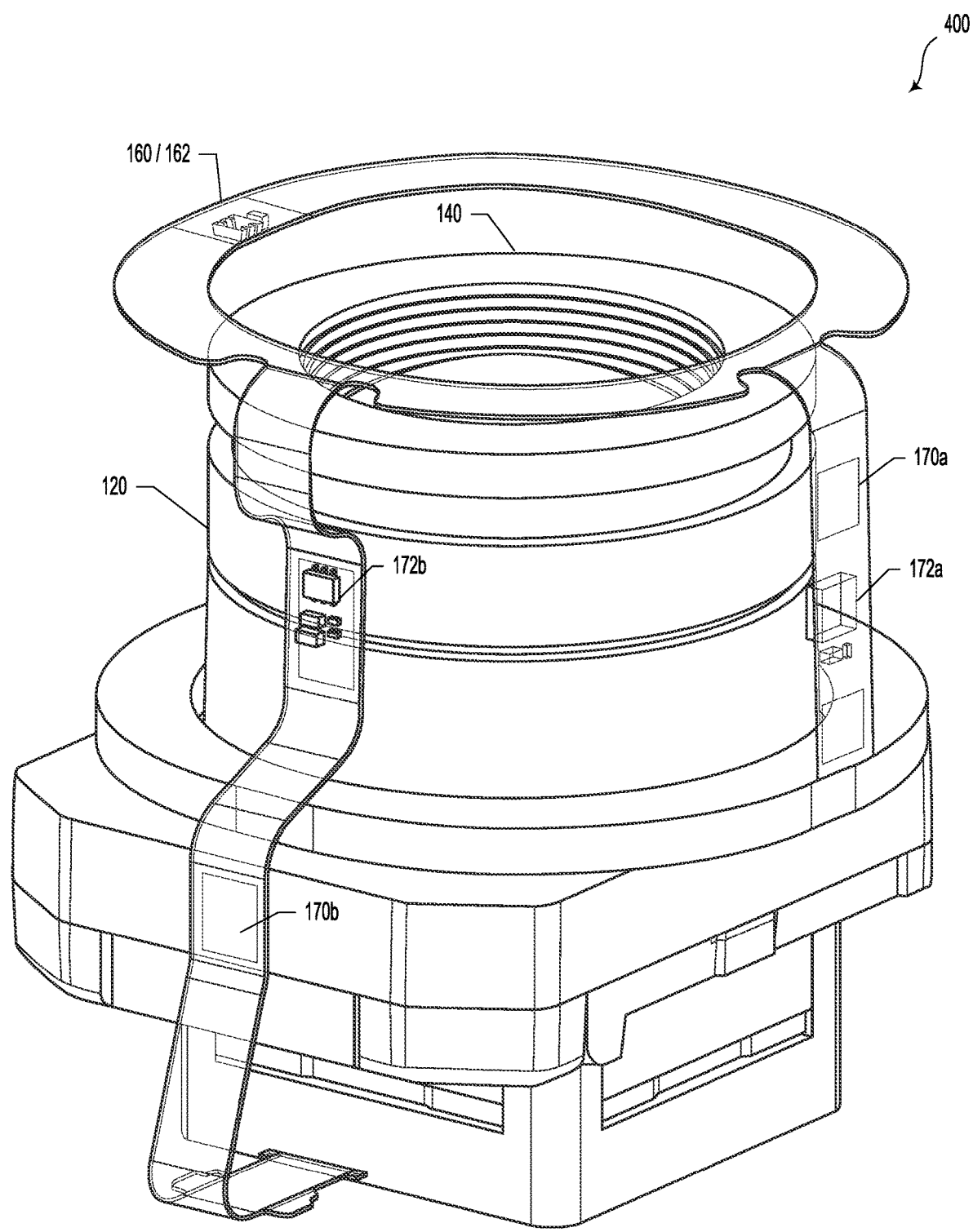
FIG. 4 illustrates the optical system of FIG. 1, according to an example embodiment.
Figure 5A:
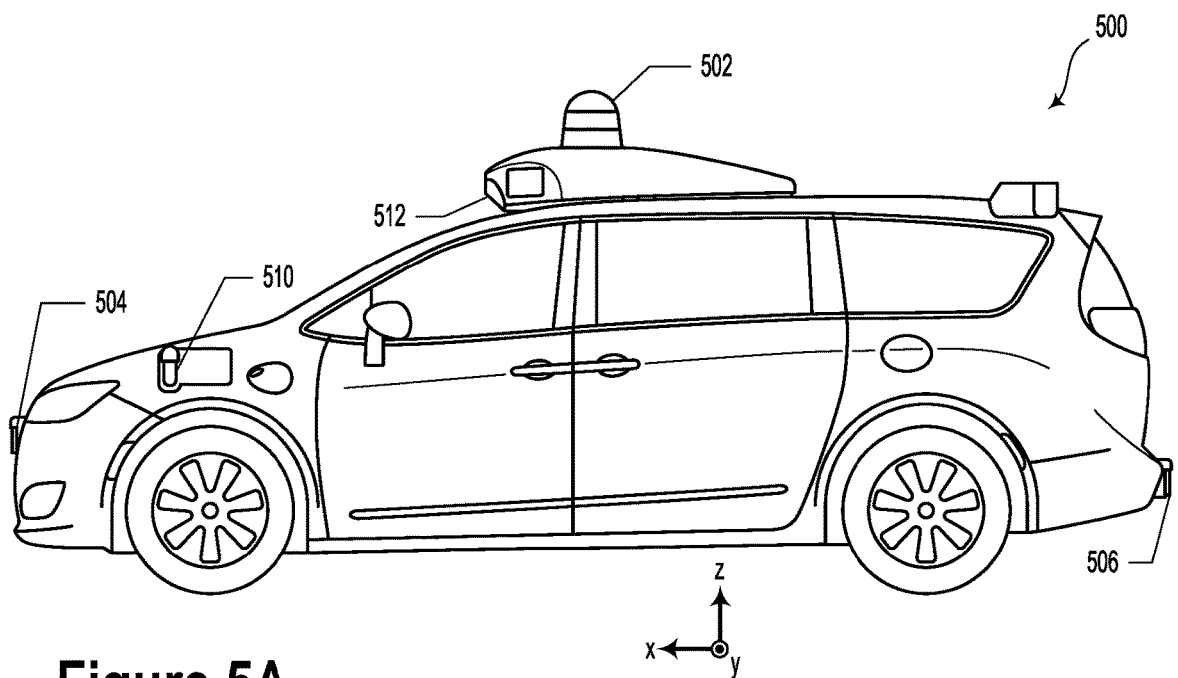
FIG. 5A illustrates a vehicle, according to an example embodiment.
Figure 5B:
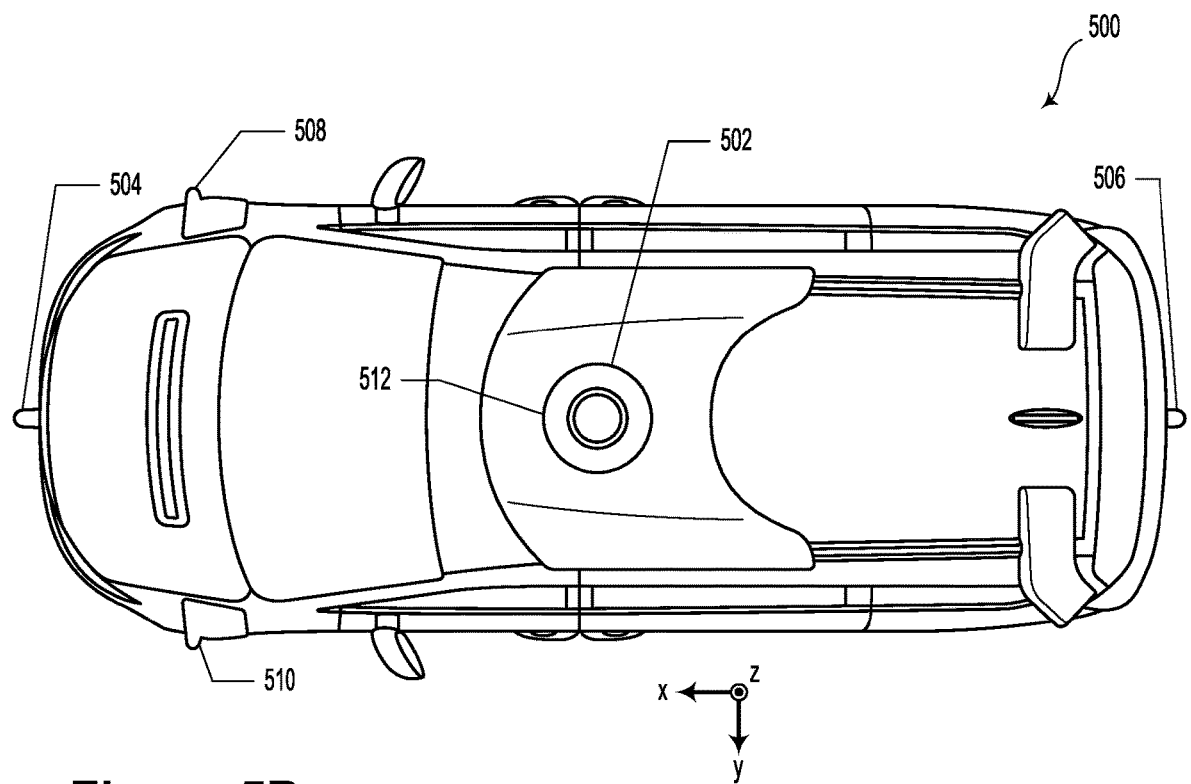
FIG. 5B illustrates a vehicle, according to an example embodiment.
Figure 5C:
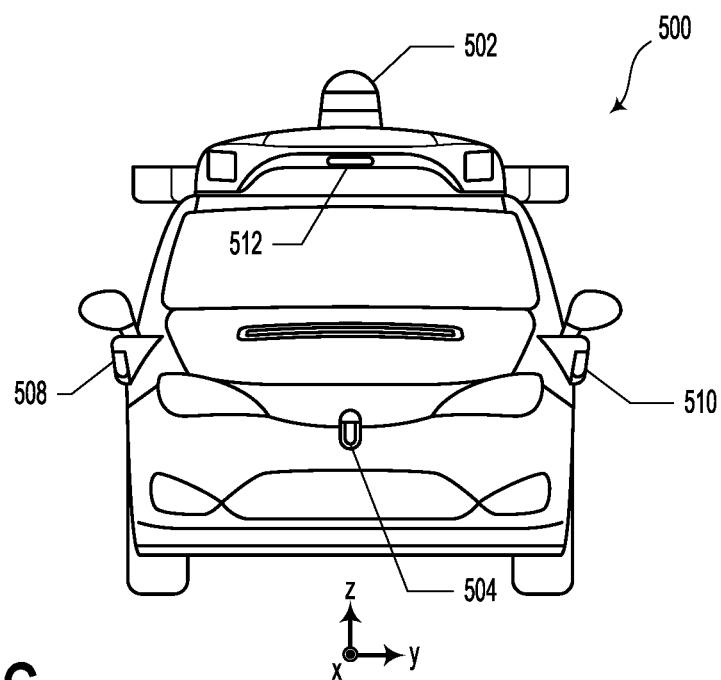
FIG. 5C illustrates a vehicle, according to an example embodiment.
Figure 5D:
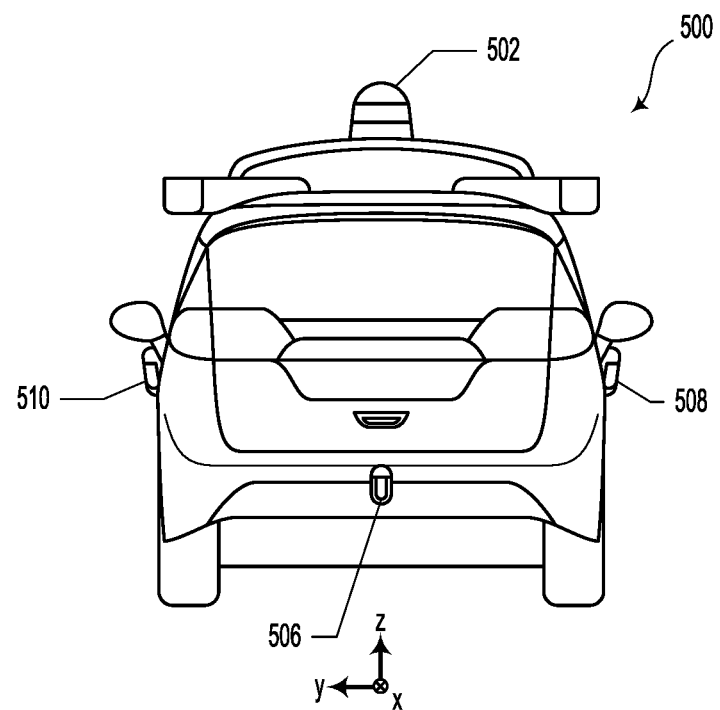
FIG. 5D illustrates a vehicle, according to an example embodiment.
Figure 5E:
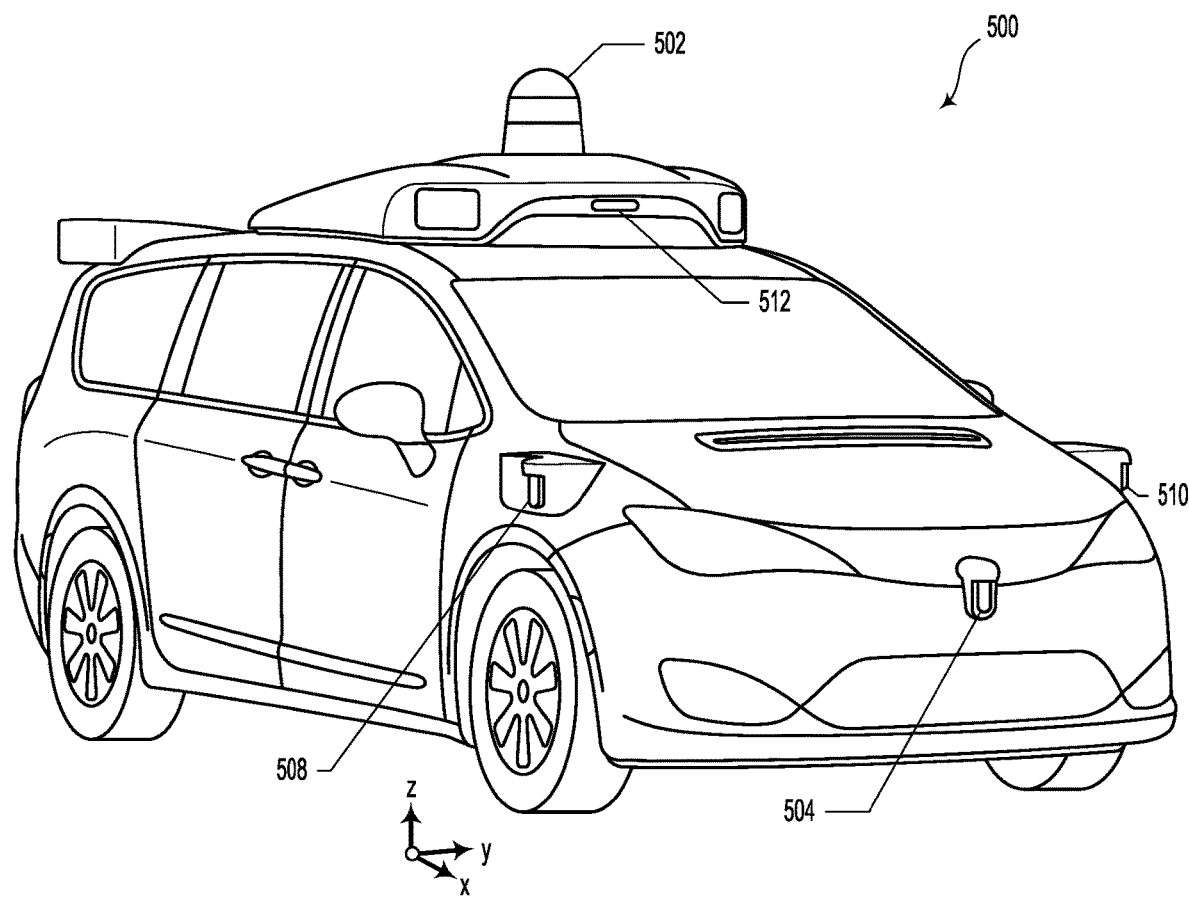
FIG. 5E illustrates a vehicle, according to an example embodiment.

FIG. 4 illustrates the optical system 100 of FIG. 1, according to an example embodiment. As illustrated, FIG. 4 shows a partial view 400 of some of the elements of optical system 100 with the outer housing 110 and optical element 130 removed.

In some embodiments, the window heater element 160 and/or the flexible heater device 162 could be shaped as a flat circular or rectangular ring. In such scenarios, the window heater element 160 could be coupled to an inner surface of the optical window 130 and could provide the functionality to controllably adjust the temperature of the optical window 130 and/or control a temperature gradient of the optical window 130. In such a fashion, the camera 140, which could be a thermal imager, could be able to better disambiguate objects within the environment and/or achieve better signal to noise at least due to improved temperature regulation of the optical window 130.

As illustrated, it will be noted that the temperature sensor(s) 170a and 170b as well as the humidity sensor(s) 172a and 172b could be disposed in various locations on and/or around various elements of optical system 100. For example, temperature sensor 170a could be disposed so as to detect an ambient temperature of the cavity within the outer housing 110 while the temperature sensor 170b could be disposed so as to directly detect the temperature of the camera 140, etc. Other locations and/or mounting configurations for the temperature sensors and humidity sensors are contemplated and possible.

III. Example Vehicles

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

In some examples, the vehicle 500 may include one or more sensor systems 502, 504, 506, 508, 510, and 512. In some embodiments, sensor systems 502, 504, 506, 508, 510, and/or 512 could include optical system 100 as illustrated and described in relation to FIG. 1. In other words, the optical systems described elsewhere herein could be coupled to the vehicle 500 and/or could be utilized in conjunction with various operations of the vehicle 500. As an example, the optical system 100 could be utilized in self-driving or other types of navigation, planning, perception, and/or mapping operations of the vehicle 500.

In some embodiments, one or more sensor systems 502, 504, 506, 508, 510, and 512 of vehicle 500 could represent one or more optical systems, such as optical system 100 as illustrated and described in relation to FIGS. 1, 2A, 2B, 3, and 4. In some examples, the one or more optical systems could be disposed in various locations on the vehicle 500 and could have fields of view that correspond to internal and/or external environments of the vehicle 500.

In such scenarios, the optical system could include an outer housing (e.g., outer housing 110) and an optical window (e.g., optical window 130) coupled to the outer housing. In some examples, the optical window is configured to be temperature-controllable.

The optical system associated with the vehicle 500 could also include a camera (e.g., camera 140) coupled to an inner support member (e.g., inner support member 120) and optically coupled to the temperature-controllable optical window. In such scenarios, the outer housing, the optical window, and the camera could be configured to be impact resistant.

In various embodiments, the vehicle 500 and the associated optical system(s) could include a pressure-sensitive adhesive (PSA) (e.g., PSA 112). In such scenarios, the outer housing could be coupled to the optical window by way of the pressure-sensitive adhesive.

In some examples, when an impact force is applied to the optical window, the force could be distributed via a primary load path (e.g., primary load path 102) and a secondary load path (e.g., secondary load path 104). The primary load path includes the optical window and the outer housing. The secondary load path includes the optical window and the inner support member.

Example embodiments may include that the camera includes a thermal infrared camera.

In various embodiments, the vehicle 500, the inner support member of the optical system could include a thermal baffle (e.g., thermal baffle 122) and/or preload foam (e.g., preload foam 124).

In an example embodiment, the optical system may include a window heater element (e.g., window heater element 160). In such examples, the window heater element could include a flexible heater device (e.g., flexible heater device 162). In such scenarios, the window heater element could be disposed between the optical window and the inner support member. In various examples, the window heater element could be coupled to the inner support member.

In various examples, the vehicle 500 may include at least one of a temperature sensor (e.g., temperature sensor 170) or a humidity sensor (e.g., humidity sensor 172). In such examples, the temperature sensor or the humidity sensor could be disposed proximate to the inner support member.

In yet further embodiments, the vehicle 500 could also include a controller (e.g., controller 150). The controller could include at least one processor (e.g., processor 152) and a memory (e.g., memory 154). The at least one processor could be configured to execute instructions stored in the memory so as to carry out operations. The operations may include receiving information indicative of at least one of a temperature or a humidity. The operations may additionally include adjusting, based on the received information, a desired temperature of the flexible heater device.

While the one or more sensor systems 502, 504, 506, 508, 510, and 512 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

As described, in some embodiments, the one or more sensor systems 502, 504, 506, 508, 510, and/or 512 could include image sensors. Additionally or alternatively the one or more sensor systems 502, 504, 506, 508, 510, and/or 512 could include lidar sensors. For example, the lidar sensors could include a plurality of light-emitter devices arranged over a range of angles with respect to a given plane (e.g., the x-y plane). For example, one or more of the sensor systems 502, 504, 506, 508, 510, and/or 512 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, 510, and/or 512 may be configured to provide respective point cloud information that may relate to physical objects within the environment of the vehicle 500. While vehicle 500 and sensor systems 502, 504, 506, 508, 510, and 512 are illustrated as including certain features, it will be understood that other types of sensor systems are contemplated within the scope of the present disclosure.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
   an outer housing;
   an inner support member;
   an optical window coupled to the outer housing and the inner support member, wherein the optical window is configured to be temperature-controllable;
   a window heater element, wherein the window heater element comprises a flexible heater device, and wherein the flexible heater device is disposed on an inner surface of the optical window; and
   a camera coupled to the inner support member, wherein the camera is optically coupled to the optical window, wherein the outer housing, the optical window, and the camera are configured to be impact resistant,
   wherein an impact force applied to the optical window is distributed via a primary load path and a secondary load path, wherein the primary load path comprises the optical window and the outer housing, wherein the secondary load path comprises the optical window and the inner support member.

2. The optical system of claim 1, wherein the optical window, outer housing, and inner support member are configured such that the primary load path dissipates impact forces up to a threshold energy value and the secondary load path dissipates excess impact forces above the threshold energy value.

3. The optical system of claim 1, wherein the camera comprises a thermal infrared camera.

4. The optical system of claim 3, wherein the inner support member comprises a thermal baffle and a preload foam.

5. The optical system of claim 1, wherein the window heater element is disposed between the optical window and the inner support member.

6. The optical system of claim 5, wherein the window heater element is coupled to the inner support member.

7. The optical system of claim 6, further comprising at least one of a temperature sensor or a humidity sensor.

8. The optical system of claim 7, wherein the temperature sensor or the humidity sensor is disposed proximate to the inner support member.

9. The optical system of claim 7, further comprising a controller, wherein the controller comprises at least one processor and a memory, wherein the at least one processor is configured to execute instructions stored in the memory so as to carry out operations, the operations comprising:
   receiving information indicative of at least one of a temperature or a humidity; and
   adjusting, based on the received information, a desired temperature of the flexible heater device.

10. A vehicle comprising:
    an optical system comprising:
       an outer housing;
       an optical window coupled to the outer housing, wherein the optical window is configured to be temperature-controllable;
       a window heater element, wherein the window heater element comprises a flexible heater device, and wherein the flexible heater device is disposed on an inner surface of the optical window; and
       a camera coupled to an inner support member and optically coupled to the optical window, wherein the outer housing, the optical window, and the camera are configured to be impact resistant,
       wherein an impact force applied to the optical window is distributed via a primary load path and a secondary load path, wherein the primary load path comprises the optical window and the outer housing, wherein the secondary load path comprises the optical window and the inner support member.

11. The vehicle of claim 10, wherein the optical window, outer housing, and inner support member are configured such that the primary load path dissipates impact forces up to a threshold energy value and the secondary load path dissipates excess impact forces above the threshold energy value.

12. The vehicle of claim 10, wherein the camera comprises a thermal infrared camera.

13. The vehicle of claim 12, wherein the inner support member comprises a thermal baffle and a preload foam.

14. The vehicle of claim 10, wherein the window heater element is disposed between the optical window and the inner support member.

15. The vehicle of claim 14, wherein the window heater element is coupled to the inner support member.

16. The vehicle of claim 15, further comprising at least one of a temperature sensor or a humidity sensor.

17. The vehicle of claim 16, wherein the temperature sensor or the humidity sensor is disposed proximate to the inner support member.

18. The vehicle of claim 16, further comprising a controller, wherein the controller comprises at least one processor and a memory, wherein the at least one processor is configured to execute instructions stored in the memory so as to carry out operations, the operations comprising:
receiving information indicative of at least one of a temperature or a humidity; and
adjusting, based on the received information, a desired temperature of the flexible heater device.

* * * * *